United States Patent
Cao et al.

(10) Patent No.: US 12,220,095 B2
(45) Date of Patent: Feb. 11, 2025

(54) METHOD FOR CONTROLLING AUTOMATIC CLEANING DEVICE, AUTOMATIC CLEANING DEVICE, AND NON-TRANSITORY STORAGE MEDIUM

(71) Applicant: Beijing Roborock Innovation Technology Co., Ltd., Beijing (CN)

(72) Inventors: Jingying Cao, Beijing (CN); Song Peng, Beijing (CN)

(73) Assignee: Beijing Roborock Innovation Technology Co., Ltd., Beijing (CN)

( * ) Notice: Subject to any disclaimer, the term of this patent is extended or adjusted under 35 U.S.C. 154(b) by 353 days.

(21) Appl. No.: 17/572,955

(22) Filed: Jan. 11, 2022

(65) Prior Publication Data

US 2022/0125270 A1     Apr. 28, 2022

Related U.S. Application Data

(63) Continuation of application No. PCT/CN2020/101173, filed on Jul. 10, 2020.

(30) Foreign Application Priority Data

Jul. 12, 2019 (CN) .......................... 201910628272.9

(51) Int. Cl.
*A47L 11/40* (2006.01)
*A47L 9/28* (2006.01)
(Continued)

(52) U.S. Cl.
CPC ........... *A47L 11/4011* (2013.01); *A47L 9/281* (2013.01); *A47L 9/2836* (2013.01); *A47L 11/24* (2013.01); *A47L 2201/06* (2013.01); *G01N 21/55* (2013.01)

(58) Field of Classification Search
CPC ...... A47L 11/24; A47L 11/4011; A47L 9/281; A47L 9/2836; A47L 2201/06; G01N 21/55
(Continued)

(56) References Cited

U.S. PATENT DOCUMENTS

2014/0289991 A1    10/2014 Landy et al.
2016/0206170 A1*   7/2016 Yi .......................... G05D 1/0223
(Continued)

FOREIGN PATENT DOCUMENTS

CN        101496706 A        8/2009
CN        102379657 A        3/2012
(Continued)

OTHER PUBLICATIONS

Office Action issued in related Chinese Patent Application No. 201910628272.9 dated Feb. 28, 2022.
(Continued)

*Primary Examiner* — Tinsae B Ayalew
(74) *Attorney, Agent, or Firm* — Morgan, Lewis & Bockius LLP (57) ABSTRACT

Embodiments of the present disclosure provide a method for controlling an automatic cleaning device, an automatic cleaning device, and a non-transitory storage medium. The method includes: obtaining a position of a working region of the automatic cleaning device; obtaining a reference data associated with the working region based on the position of the working region; obtaining a current environment parameter of the working region; comparing the current environment parameter with the reference data to generate a comparing result; and controlling the automatic cleaning device based on the comparison result.

12 Claims, 5 Drawing Sheets

(51) Int. Cl.
*A47L 11/24* (2006.01)
*G01N 21/55* (2014.01)

(58) Field of Classification Search
USPC .......................................................... 134/123
See application file for complete search history.

(56) References Cited

U.S. PATENT DOCUMENTS

| | | | |
|---|---|---|---|
| 2019/0029486 A1 | 1/2019 | Suvarna et al. | |
| 2019/0049978 A1 | 2/2019 | Brede et al. | |
| 2019/0049979 A1 | 2/2019 | Brede et al. | |

FOREIGN PATENT DOCUMENTS

| | | |
|---|---|---|
| CN | 105380575 A | 3/2016 |
| CN | 105496314 A | 4/2016 |
| CN | 105796001 A | 7/2016 |
| CN | 106541407 A | 3/2017 |
| CN | 107224249 A | 10/2017 |
| CN | 107233051 A | 10/2017 |
| CN | 107300872 A | 10/2017 |
| CN | 107943044 A | 4/2018 |
| CN | 107981790 A | 5/2018 |
| CN | 108113595 A | 6/2018 |
| CN | 108151730 A | 6/2018 |
| CN | 108403007 A | 8/2018 |
| CN | 108606728 A | 10/2018 |
| CN | 109330485 A | 2/2019 |
| CN | 109330501 A | 2/2019 |
| CN | 109431381 A | 3/2019 |
| CN | 109662654 A | 4/2019 |
| CN | 109717795 A | 5/2019 |
| CN | 109814546 A | 5/2019 |
| EP | 3048502 A1 | 7/2016 |
| JP | H09-187409 A | 7/1997 |
| KR | 10-1526117 B1 | 6/2015 |

OTHER PUBLICATIONS

Office Action issued in related Chinese Patent Application No. 201910628272.9 dated Jul. 5, 2021.
International Search Report issued in related International Patent Application No. PCT/CN2020/101173 dated Oct. 12, 2020.
Extended European Search Report of Application No. 20840672.8, dated Jul. 5, 2023.

* cited by examiner

METHOD FOR CONTROLLING AUTOMATIC CLEANING DEVICE, AUTOMATIC CLEANING DEVICE, AND NON-TRANSITORY STORAGE MEDIUM

CROSS REFERENCE TO RELEVANT APPLICATIONS

The present disclosure is a Continuation Application of PCT patent application No. PCT/CN2020/101173, which is filed on Jul. 10, 2020, and claims the priority of Chinese patent application No. 201910628272.9 with a filing date of Jul. 12, 2019; the entire disclosures of both are incorporated herein by reference for all purposes.

TECHNICAL FIELD

The present disclosure relates to the field of automatic detection technologies and, in particular, to a method for controlling an automatic cleaning device, an automatic cleaning device, and a non-transitory storage medium.

BACKGROUND

With the development of technologies, various automatic cleaning devices appear, for example, dry cleaning robots and wet cleaning robots. When receiving a cleaning instruction, an automatic cleaning device can automatically execute the cleaning instruction to clean, which can save labor and lower labor costs.

Without a user's operation, the cleaning robot can perform cleaning while automatically traveling in a to-be-cleaned region. Due to different floor materials (such as wood floors and carpets), different amounts of debris, or different types of debris on working regions of the cleaning robot, the cleaning robot usually works in different modes, or the cleaning robot avoids specific regions. In this case, the cleaning robot generally detects the floor environment in the working process.

SUMMARY

In view of the previous description, embodiments of the present disclosure provide a method for controlling an automatic cleaning device, an automatic cleaning device, and a non-transitory storage medium.

According to embodiments of the present disclosure, a method for controlling an automatic cleaning device is provided, where the method includes:
 obtaining a position of a working region of the automatic cleaning device;
 obtaining a reference data associated with the working region based on the position of the working region;
 obtaining a current environment parameter of the working region;
 comparing the current environment parameter with the reference data to generate a comparing result; and
 controlling the automatic cleaning device based on the comparison result.

According to embodiments of the present disclosure, an automatic cleaning device is provided, where the automatic cleaning device includes a processor and a memory, where the memory stores computer program instructions that can be executed by the processor, and the processor executes the computer program instructions to implement the steps of the method described above.

According to embodiments of the present disclosure, a non-transitory storage medium is provided, where the non-transitory storage medium stores computer program instructions, and the computer program instructions can be executed by a processor to implement the steps of the method described above.

BRIEF DESCRIPTION OF DRAWINGS

To describe the technical solutions in the embodiments of the present disclosure or in the conventional technology more clearly, the following briefly describes the accompanying drawings needed for describing the embodiments or the existing technology. Clearly, the accompanying drawings in the following description show some embodiments of the present disclosure, and persons of ordinary skill in the art can still derive other drawings from these accompanying drawings without creative efforts.

DESCRIPTION OF EMBODIMENTS

To make the objectives, technical solutions, and advantages of the present disclosure clearer, the following further describes the present disclosure in detail with reference to the accompanying drawings. Clearly, the described embodiments are merely some rather than all of the embodiments of the present disclosure. All other embodiments obtained by persons of ordinary skill in the art, which are based on the embodiments of the present disclosure without creative efforts, shall fall within the protection scope of the present disclosure.

The terms used in the embodiments of the present disclosure are merely for illustrating specific embodiments, and are not intended to limit the present disclosure. The terms "a," "the," and "this" of singular forms used in the embodiments and the appended claims of the present disclosure are also intended to include plural forms, unless otherwise specified clearly in the context. "A plurality of" generally includes at least two.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between associated objects.

It should be understood that, although terms such as "first," "second," and "third" may be used in the embodiments of the present disclosure. These terms of "first," "second," and "third" are used merely to distinguish different components. For example, without departing from the scope of the embodiments of the present disclosure, a first component may also be referred to as a second component, and similarly, the second component may also be referred to as the first component.

Depending on the context, for example, the word "if" used herein may be explained as "while" or "when" or "in response to determining" or "in response to detection." Similarly, depending on the context, the phrase "if determining" or "if detecting (a stated condition or event)" may be explained as "when determining" or "in response to determining" or "when detecting (the stated condition or event)" or "in response to detecting (the stated condition or event)."

It should further be noted that, the terms "include," "comprise," or any other variant thereof are intended to cover a non-exclusive inclusion, so that a product or an apparatus that includes a list of elements not only includes those elements but also includes other elements that are not expressly listed, or further includes elements inherent to such a product or an apparatus. Without further limitation, an element limited by "includes a . . . " does not preclude the existence of additional identical elements in the product or apparatus that includes the element.

The following describes optional embodiments of the present disclosure in detail with reference to the accompanying drawings.

Figure 1:
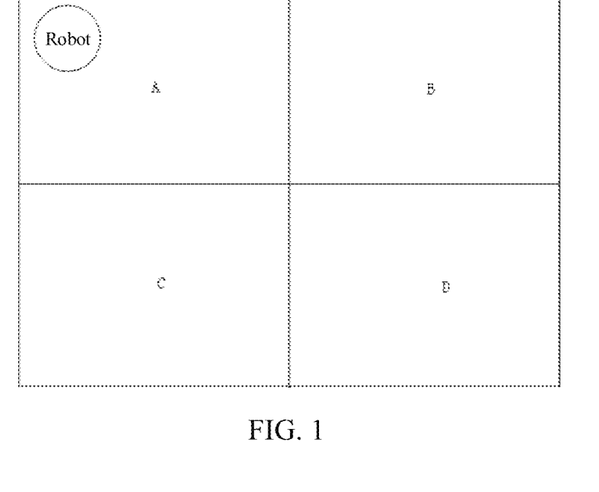
FIG. 1 is a schematic diagram of an application scenario according to some embodiments of the present disclosure.

FIG. 1 shows a possible application scenario according to some embodiments of the present disclosure. The application scenario includes a cleaning robot, such as a dry cleaning robot, a wet cleaning robot, etc. In some embodiments, the cleaning robot may be an automatic cleaning device, and specifically may be an automatic dry cleaning robot or an automatic wet cleaning robot. In some embodiments, the cleaning robot may be provided with a navigation system, which can detect and determine a working region and determine a position of the cleaning robot in the working region. The cleaning robot may be provided with various sensors, such as an infrared sensor, a laser sensor, etc., for real-time detection of floor debris in the working region. In other embodiments, the automatic cleaning device may be provided with a touch-sensitive display to receive an operation instruction input by a user. The automatic cleaning device may be further provided with a wireless communications module such as a WiFi module or a Bluetooth module to connect to an intelligent terminal, and can receive an operation instruction from the user using the intelligent terminal through the wireless communications module.

Figure 2:
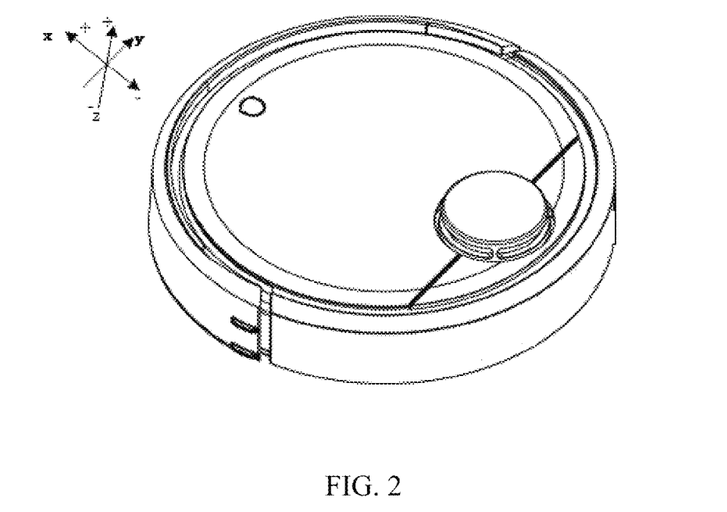
FIG. 2 is a stereoscopic diagram of a structure of an automatic cleaning device according to some embodiments of the present disclosure.

As shown in FIG. 2, an automatic cleaning device 100 can travel on the floor through various combinations of movement relative to the following three mutually perpendicular axes defined by a main body 110: a front-back axis X, a lateral axis Y, and a central vertical axis Z. The forward driving direction along the front-back axis X is marked as "forward," and the backward driving direction along the front-back axis X is marked as "backward." A direction of the lateral axis Y is essentially a direction extending between the right and left wheels of the robot along an axial center defined by the center point of a driving wheel module 141.

The automatic cleaning device 100 can rotate around the axis Y. In a case that a forward portion of the automatic cleaning device 100 is tilted upward and a backward portion is tilted downward, "pitchup" is formed. In a case that the forward portion of the automatic cleaning device 100 is tilted downward and the backward portion is tilted upward, "pitchdown" is formed. In addition, the robot 100 can rotate around the axis Z. In the forward direction of the automatic cleaning device 100, in the case that the automatic cleaning device 100 tilts to the right of the axis X, "right turn" is formed; and in the case that the automatic cleaning device 100 tilts to the left of the axis X, "left turn" is formed.

Figure 3:
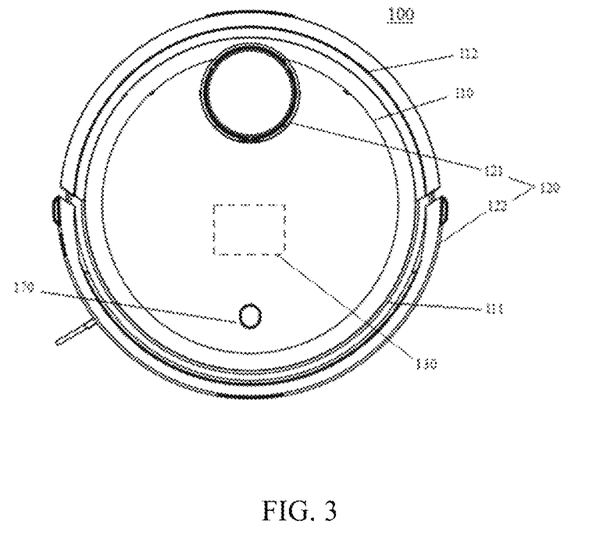
FIG. 3 is a top view of a structure of an automatic cleaning device according to some embodiments of the present disclosure.

As shown in FIG. 3, the automatic cleaning device 100 includes a machine body 110, a perception system 120, a control system, a driving system 140, a cleaning system, a power system, and a man-machine interaction system 170.

The machine body 110 includes a forward portion 111 and a backward portion 112, and has an approximate circular shape (both the forward portion and the backward portion are circular) or may have other shapes, including, but not limited to, the approximate D-shape, that is, the forward portion is rectangular and the backward portion is circular.

As shown in FIG. 3, the perception system 120 may include sensing apparatuses such as a position determining apparatus 121 located in an upper part of the machine body 110, a bumper 122 located to the forward portion 111 of the machine body 110, a cliff detector 123, an ultrasonic sensor, an infrared sensor, a magnetometer, an accelerometer, a gyroscope, and an odometer, the perception system 120 provides position information and movement status information of the automatic cleaning device 100 to the control system 130. The positon determining apparatus 121 may include at least one of a camera or a laser distance sensor (LDS). The following describes how to determine a position by using an example of a laser distance sensor using a triangular ranging method. The basic principle of the triangular ranging method is based on a proportional relationship between similar triangles. Details are omitted here for simplicity.

The laser distance sensor includes a light-emitting unit and a light-receiving unit. The light-emitting unit may include a light source that emits light, and the light source may include a light-emitting element such as an infrared light-emitting diode (LED) or visible LED. Alternatively, the light source may be a light-emitting element that emits laser beams. In these embodiments, a laser diode (LD) is used as an example of the light source. Specifically, due to monochromaticity, directionality, and collimation of the laser beam, a laser light source may have more accurate measurement than other light sources. The LD may be a point laser for measuring two-dimensional position information of an obstacle, or may be a line laser for measuring three-dimensional position information of an obstacle within a certain range.

The light-receiving unit may include an image sensor, and a light spot reflected or scattered by an obstacle is formed on the image sensor. The image sensor may be a set of a plurality of unit pixels in one or more rows. The light-receiving element can convert an optical signal into an electrical signal. The image sensor may be a complementary metal-oxide-semiconductor (CMOS) sensor or a charge coupled device (CCD) sensor; the CMOS sensor has the advantage of cost. In addition, the light-receiving unit may include a light-receiving lens component. Light reflected or scattered by an obstacle may travel through the light-receiving lens component to form an image on the image sensor. The light-receiving lens component may include one or more lenses. A base may support the light-emitting unit and the light-receiving unit, and the light-emitting unit and the light-receiving unit are arranged on the base at a certain distance from each other. In order to measure obstacles in the omnidirection around the robot, the base may be rotatably arranged on the body 110; or the base may not rotate but a rotation element is arranged to redirect the emitted light and the received light. An optical coupling element and an encoding disk can be arranged to obtain a rotational angular velocity of the rotation element. The optical coupling element senses toothed gaps on the encoding disk and divides a distance between the toothed gaps by an elapse time of the distance between the toothed gaps to obtain an instantaneous angular velocity. Higher density of toothed gaps on the encoding disk indicates higher accuracy and precision of the measurement, which needs a precise structure and a large calculation amount. On the contrary, lower density of toothed gaps indicates lower accuracy and precision of the measurement, which has a simple structure, little calculation amount, and low costs.

A data processing apparatus, such as a digital signal processor, connected to the light-receiving unit records obstacle distances of all angles relative to an angle of 0 degrees of the robot and transmits the obstacle distances to a data processing unit, such as an application processor including a central processing unit (CPU), in the control system 130. The CPU runs a particle filter-based positioning algorithm to obtain a current positon of the robot and generates a map based on the position for navigation. The positioning algorithm is optionally simultaneous localization and mapping (SLAM).

The laser distance sensor based on the triangular ranging method can measure a distance at an infinite distance in principle. However, the laser distance sensor actually can hardly perform measurement for a large distance, for example, over six meters; one main reason is that the measurement is limited by dimensions of a pixel unit on a sensor of the light-receiving unit. Besides that, an optical-to-electrical conversion speed of the sensor, a data transmission speed between the sensor and the connected DSP, and a calculation speed of the DSP may affect the measurement distance. A value obtained by the laser distance sensor under the action of temperature is also subject to a system-intolerable change, mainly because thermal expansion deformation of a structure between the light-emitting unit and the light-receiving unit causes an angle change between incident light and emitted light and the light-emitting unit and the light-receiving unit have a temperature drift problem. After the laser distance sensor is used for a long time, deformation caused by various factors such as a temperature change and vibration may also affect a measurement result. The accuracy of the measurement result determines the accuracy of generating a map, is the basis for a next strategy implemented by the cleaning device, and therefore is important.

As shown in FIG. 3, the forward portion 111 of the machine body 110 may carry a bumper 122. When the driving wheel module 141 drives the robot to move on the floor during cleaning, the bumper 122 detects one or more events in the traveling route of the automatic cleaning device 100 by using a sensor system, such as an infrared sensor. Based on the events detected by the bumper 122, such as obstacles and walls, the automatic cleaning device 100 may control the driving wheel module 141 to enable the automatic cleaning device 100 to respond to the events, for example, keep away from the obstacles.

The control system 130 may be arranged on the main circuit board in the machine body 110. The control system 130 includes a non-transitory memory, such as a hard disk, a flash memory, and a random access memory. The control system 130 includes a computing processor for communication, such as a central processing unit and an application processor. The application processor generates, based on obstacle information returned by the laser distance sensor and by using a positioning algorithm such as SLAM, an instant map of an environment in which the robot is located. With reference to distance information and velocity information returned by sensing apparatuses such as the bumper 122, the cliff sensor 123, the ultrasonic sensor, the infrared sensor, the magnetometer, the accelerometer, the gyroscope, and the odometer, the control system 130 comprehensively determines a current working status of the automatic cleaning device, such as crossing a threshold, moving on a carpet, reaching a cliff, getting stuck, having a full dust box, or being picked up. In addition, the control system 130 provides a specific next actions, based on different situations, to make the performance of the cleaning device meet a certain requirement and improve user experience. Further, the control system 130 may plan an efficient and reasonable cleaning route and cleaning manner based on information about the instant map generated based on SLAM, thereby improving the cleaning efficiency of the cleaning device.

Figure 4:
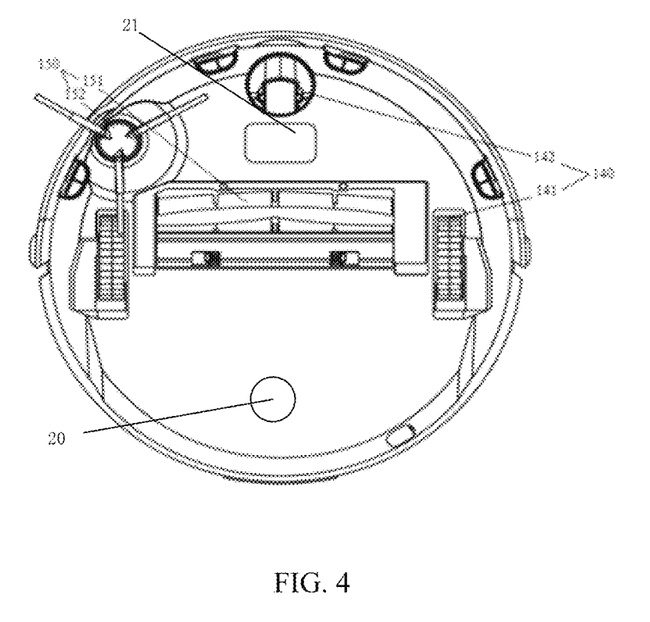
FIG. 4 is a bottom view of a structure of an automatic cleaning device according to some embodiments of the present disclosure.

As shown in FIG. 4, the driving system 140 can control, based on a driving command, including distance and angle information such as components x, y, and 0, the robot 100 to traverse across a floor. The driving system 140 may include a driving wheel module 141. The driving wheel module 141 may control a left wheel and a right wheel simultaneously. To control the movement of the machine accurately, the driving wheel module 141 may include a left driving wheel module and a right driving wheel module. The left and right driving wheel modules are symmetrically arranged along a lateral axis that is defined by the body 110. To enable the cleaning device to move stably on the floor or to have a high-movement ability, the robot may include one or more driven wheels 142, and the driven wheel include but are not limited to a universal wheel. The driving wheel module includes a traveling wheel, a driving motor, and a control circuit for controlling the driving motor. The driving wheel module may be connected to a circuit for measuring a drive current, and to an odometer. The driving wheel module 141 may be detachably connected to the body 110 for facilitating assembly, disassembly, and maintenance. The driving wheel may have a biased-to-drop hanging system, which is moveably attached to the body 110. For example, the driving wheel may be rotatably attached to the body 110, and receives a spring bias that is offset downward and away from the body 110. The spring bias allows the driving wheel to maintain contact and traction with the floor, and a cleaning element of the automatic cleaning device 100 is also in contact with the floor 10 with specific pressure.

The cleaning system may include a dry cleaning system and/or a wet cleaning system. The main cleaning capacity of the dry cleaning system is generated by a sweeping system 151 that includes a rolling brush, a dust box, a fan, an air outlet, and connecting parts between the four parts. The rolling brush interfering with the floor agitates debris on the floor and brings the debris to the a dust suction port between the rolling brush and the dust box, and the debris is sucked into the dust box by airflow that is generated by the fan and passes through the dust box. The dust-removal ability of the cleaning device may be represented by dust pickup efficiency. The dust pickup efficiency may be affected by the rolling brush structure and a material thereof, by utilization of the airflow of an air duct, including the dust suction port, the dust box, the fan, the air outlet, and the connecting parts between the four parts, and by a type and power of the fan, and therefore. Therefore, the cleaning system is a complex system. Compared with a conventional plug-in cleaner, improving the dust-removal ability is more important for power-limited cleaning robots. A higher dust-removal ability effectively reduces the power consumption; for example, a device that can clean 80 square meters of floor with a single charge can be improved to clean 100 square meters or more of floor. Moreover, as the frequency of charging is reduced, battery life will increase and the frequency of battery replacement will decrease. The improvement of dedusting capability is an important factor for optimizing user experience because the user can sense whether the floor is clean after operation by the cleaning robot. The dry cleaning system may further include a side brush 152 having a rotating shaft. The rotating shaft is located at an angle relative to the floor, and the side brush 152 is configured to move the debris into the cleaning area of the roller brush 61.

The power system includes a rechargeable battery, for example, a NiMH battery or a lithium battery. The rechargeable battery may be connected to a charging control circuit, a battery pack charging temperature detection circuit, and a battery undervoltage monitoring circuit. The charging control circuit, the battery pack charging temperature detection circuit, and the battery undervoltage monitoring circuit are connected to a single-chip microcomputer control circuit. The robot is charged by connecting a charging electrode arranged on a side or a lower part of the body to the base station.

The man-machine interaction system 170 includes buttons on a panel for the user to select functions. The man-machine interaction system 170 may further include a display screen, an indicator, and/or a speaker, which display the current status of the device or function selection items for the user. The man-machine interaction system 170 may further include a mobile phone client application. For a route-navigated automatic cleaning device, the mobile phone client application can show the user a map of the environment in which the device is located, as well as the position of the device, providing the user with abundant and user-friendly function selection terms.

Figure 5:
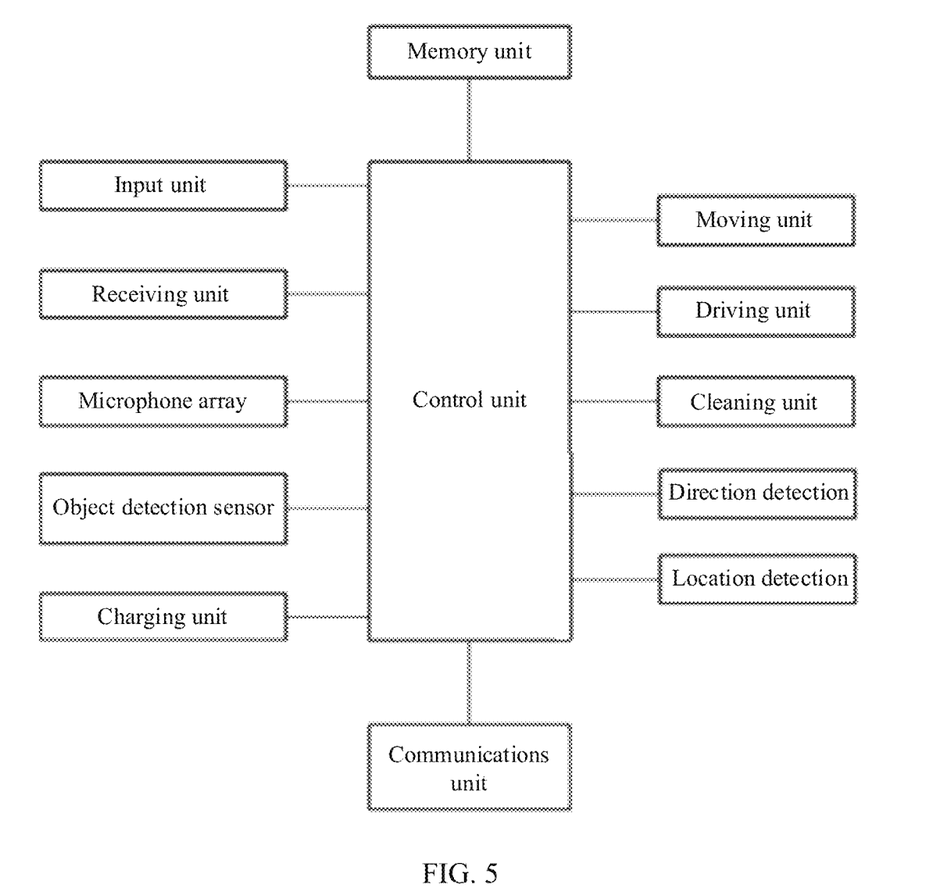
FIG. 5 is a structural block diagram of an automatic cleaning device according to some embodiments of the present disclosure.

FIG. 5 is a block diagram of an automatic cleaning device according to other embodiments of the present disclosure.

The automatic cleaning device, according to some embodiments of the present disclosure, may include: a microphone array unit for recognizing a user's voice, a communications unit for communicating with a remote control device or another device, a moving unit for driving the main body, a cleaning unit, and a memory unit for storing information. An input unit (buttons of the cleaning device, etc.), an object detection sensor, a charging unit, the microphone array unit, a direction detection unit, a position detection unit, the communications unit, a driving unit, and the memory unit can be connected to a control unit to transmit information to the control unit or receive information from the control unit.

The microphone array unit is configured to compare a voice input through a receiving unit with the information stored in the memory unit to determine whether the input voice corresponds to a specific command. If it is determined that the input voice corresponds to the specific command, the corresponding command is transmitted to the control unit. If there is no information corresponding to the detected voice cannot be stored in the memory unit, the detected voice may be considered as noise and is ignored.

For example, the detected voice corresponds to the phrases "come over, come here, get here, and arrive here," and there is a text control command (come here) corresponding to the phrases in the information stored in the memory unit. In this case, the corresponding command may be transmitted to the control unit.

The direction detection unit is configured to detect a direction of the voice by using a time difference or level of the voice that is input into a plurality of receiving units. The direction detection unit transmits the direction of the detected voice to the control unit. The control unit may determine a moving path by using the voice direction detected by the direction detection unit.

The position detection unit is configured to detect coordinates of the cleaning device in the predetermined map information. In some embodiments, information detected by a camera may be compared with the map information stored in the memory unit to detect a current position of the cleaning device. In addition to the camera, the position detection unit may further use a global positioning system (GPS).

In addition, the position detection unit may detect whether the cleaning device is positioned at a specific location. For example, the position detection unit may include a unit for detecting whether the cleaning is positioned on a base station.

For example, in detecting whether the cleaning device is positioned on a base station, it can be detected, based on whether power is input into the charging unit. For another example, a charging position detection unit disposed on the cleaning or the base station may be used to detect whether the cleaning device is positioned at the base station.

The communications unit is configured to transmit/receive predetermined information to/from a remote control device or another device. The communications unit may be configured to update the map information of the cleaning device.

The driving unit is configured to operate the moving unit and the cleaning unit. The driving unit is configured to move the moving unit along a moving path determined by the control unit.

The memory unit stores predetermined information related to the operation of the cleaning device. For example, map information of the region in which the sweeping robot is positioned, control command information corresponding to the voice recognized by the microphone array unit, direction angle information detected by the direction detection unit, position information detected by the position detection unit, and obstacle information detected by the object detection sensor may be stored in the memory unit.

The control unit is configured to receive information detected by the receiving unit, the camera, and the object detection sensor. The control unit is configured to recognize the user's voice based on the transmitted information, detect the direction in which the voice occurs, and detect the position of the automatic cleaning device. In addition, the control unit may be further configured to operate the moving unit and the cleaning unit.

Figure 6:
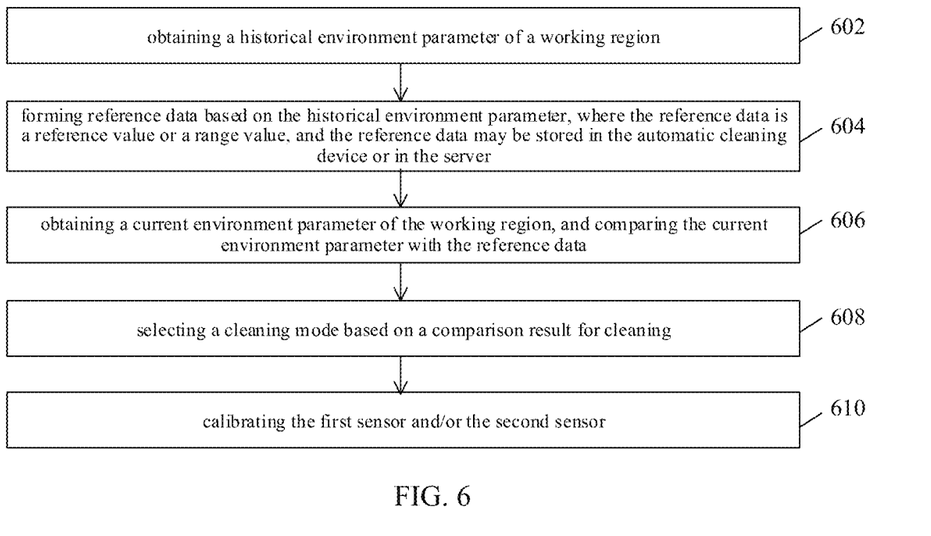
FIG. 6 is a schematic flowchart of a method for controlling an automatic cleaning device according to some embodiments of the present disclosure.

FIG. 6 shows the automatic cleaning device applied to the application scenario in FIG. 1. Embodiments of the present disclosure provide a method for controlling an automatic cleaning device. The method may include step S602 to step S610.

Step S602 includes obtaining a historical environment parameter of a working region.

The working region is a region to be cleaned by the automatic cleaning device. The working region may include an entire region to be cleaned by the automatic cleaning device, or a part of the entire region to be cleaned by the automatic cleaning device. The working region includes, but is not limited to, an entire house, a specific room (such as a living room or a bedroom), an office area, a shopping mall, a street, etc.

The historical environment parameters may be data about the working region collected by the automatic cleaning device during cleaning of the working region. The historical environment parameter may include, but is not limited to, a density of debris, a position of an obstacle, flatness of the floor, material of the floor (wood floor, carpet, tile floor, an asphalt road, a dirt roads, etc.), an oil stain, water, etc. These parameters may be obtained by the sensors on the automatic cleaning device during a period of cleaning. Optionally, the environment parameter includes: a reflectivity parameter or an image parameter.

The "obtaining" usually is performed by sensors on the automatic cleaning device. The sensors include but are not limited to a cliff sensor, an ultrasonic sensor, an infrared sensor, a magnetometer, an accelerometer, a gyroscope, an odometer, a CCD, an optical detection sensor, etc. The data obtained by the foregoing sensors may be stored in the automatic cleaning device or in a server.

Optionally, the obtaining a historical environment parameter of a working region may include: obtaining a pre-clean historical environment parameter of the working region or a post-clean historical environment parameter of the working region; and forming a pre-clean historical environment parameter dataset or a post-clean historical environment parameter dataset.

Specifically, a first sensor 20 obtains the post-clean historical environment parameter of the working region, where the first sensor 20 may be disposed at the back end of the automatic cleaning device; or a second sensor 21 obtains the pre-clean historical environment parameter of the working region, where the second sensor 21 may be disposed at a front end of the automatic cleaning device, as shown in FIG. 4.

In some embodiments, the automatic cleaning device is provided with a plurality of sensors, and the plurality of sensors may be arranged at the forward portion or backward portion of the automatic cleaning device (for example, the forward portion and the backward portion of the bottom of the automatic cleaning device). The sensor may include a light emitting unit and a light receiving unit, and may obtain reflectivity of the floor through reflection of the emitted light on the floor. For example, the second sensor 21 arranged on the bottom of the forward portion of the automatic cleaning device may be configured to detect the pre-clean reflectivity of the floor, and the first sensor 20 arranged on the bottom of the backward portion of the automatic cleaning device may be configured to detect the post-clean reflectivity of the floor.

In some embodiments of the present disclosure, the step of obtaining a historical environment parameter of a working region includes: determining a position of the working region by using a navigation system of the automatic cleaning device; and obtaining the historical environment parameter based on the position.

The navigation system may include the position determining apparatus 121 described above, which includes at least one of a camera and a laser distance sensor (LDS). The navigation system may alternatively include precise positioning apparatuses such as GPS and BeiDou. The navigation system may determine an accurate position of the automatic cleaning device, or an accurate position of the automatic cleaning device in the working region. For example, the navigation system may determine that the automatic cleaning device is in a living room or a bedroom of a house. Further, the navigation system may determine the accurate position of the cleaning device in a living room or a bedroom, such as the automatic cleaning is near a tea table in the living room or near a wardrobe in the bedroom.

Step S604 includes: forming reference data based on the historical environment parameter, where the reference data is a reference value or a range value, and the reference data may be stored in the automatic cleaning device or in the server.

The reference data is a reference benchmark for a specific region formed by processing the historical environment parameter. The benchmark may be a single value or a range value. For example, based on a large quantity of post-clean data for the living room collected by the automatic cleaning device, a post-clean reference value is obtained, which indicates the state of the floor. For example, if the state of the clean floor is represented by reflectivity, it may be a series of reflectivity of the floor, such as 70%, 60%, etc. The reflectivity is used as a reference value for subsequent cleaning. In other embodiments, the cleaning device collects the pre-clean data of the living room, for example, the sensor disposed at the forward portion of the cleaning device collects the pre-clean reflectivity of the living room floor, which may be 30%-50%. Collected reflectivity of a road is 10%-30%. In an embodiment of the present disclosure, the lower reflectivity, the dirtier floor. The pre-clean reflectivity of a region is used as a reference value, and a cleaning mode is selected by comparing the real-time reflectivity of the region with the reference value. The reflectivity may be indicated by a ratio of reflected light intensity to incident light intensity, or may be indicated by converted value from the ratio mentioned above, such as 1.5, 10, etc. The converted value is a ratio obtained based on a reference. For example, in a case that the reflectivity of 20% is defined as 1, the converted value of the reflectivity of 20% may be 2.

The reference data may be stored in the automatic cleaning device, or may be stored in the server or the cloud. The reference data may be invoked from the automatic cleaning device or the server for use.

Optionally, the step of forming reference data based on the historical environment parameter may include: screening a pre-clean historical environment parameter dataset or a post-clean historical environment parameter dataset; performing an averaging operation on the screened dataset, and forming the reference data based on the averaged dataset. Besides that, the collected historical environment parameter data may be processed based on the Kalman filter algorithm. The Kalman filter algorithm has the capacity for adapting great data changes in data establishment. In an embodiment, the automatic cleaning device establishes a two-dimensional grid map by using a sensor and the SLAM algorithm during cleaning. The coordinate of the automatic cleaning device on the map may be determined and the coordinate and grip of the first sensor 20 on the map may be determined by the position where the first sensor 20 is installed. The date corresponding to the grip may be obtained, thereby obtaining data stored in a grid on the map. For example, the cleaning device processes the reflectivity readings obtained by the first sensor 20 and the data stored in the grid (which can be initialized into a specific value such as 50%) based on the Kalman filter algorithm, to obtain the reference value.

Certainly, other algorithms can alternatively be used for processing, which is not limited in the embodiments of the present disclosure.

In a practical processing of collecting data, a special case may cause the fluctuation of the collected data. For example, during collection of historical data for the living room, the pre-clean reflectivity of the floor is usually about 50%, and the post-clean reflectivity of the floor is usually about 90%. However, in a case that the floor is dirtier than usual, it is possible that the obtained pre-clean reflectivity of the floor is 30% and the obtained post-clean reflectivity of the floor is 60%. Consequently, there is a significant deviation in the historical environment parameters that form the reference data. In this case, the data with significant deviation may be removed. After the data with significant deviation is removed, an average value of the remained data is calculated to obtain a reference value. For example, an average value of 88%, 89%, 90%, 91%, and 92% is calculated to obtain a reference value of 90%.

Step S606 includes: obtaining a current environment parameter of the working region, and comparing the current environment parameter with the reference data.

The current environment parameters may be data about the working region collected by the automatic cleaning device in real time during cleaning of the working region. The current environment parameter may include, but is not limited to, a density of debris, a position of an obstacle, flatness of the floor, a material of the floor (wood floor, carpet, tile floor, an asphalt road, a dirt roads, etc.), an oil stain, water, etc. The environment parameters may be obtained by the sensors on the automatic cleaning device.

Through collecting the data of the working region in real-time manner during cleaning the working region, a cleaning mode may be determined. For example, in a case that the current environment parameter is 30% and the reference value is 90%, the strong cleaning mode may be selected. In a case that the current environment parameter is 60, that is 60%, the light cleaning mode may be selected.

Optionally, the step of obtaining a current environment parameter of the working region in real time and comparing the current environment parameter with the reference data may include: determining a position of the working region by using a navigation system of the automatic cleaning device; obtaining a current environment parameter of the position in real time; and comparing the current environment parameter with the reference data.

The navigation system determines the position of the working region, and the reference data of the region is used to select an accurate cleaning mode. For example, the cleaning device travels to the living room, and obtains the reference data of the living room, and selects a cleaning mode based on the comparison between the reference data of the living room and the current environment parameter of the living room. In a case that the automatic cleaning device travels to the children's bedroom, the cleaning device obtains the a reference data of the children's bedroom, and selects a cleaning mode based on the comparison between the reference data of the children's bedroom and the current environment parameter of the living room, which is an accurate and appropriate cleaning mode selection manner.

Step S608 includes: selecting a cleaning mode based on a comparison result for cleaning.

Optionally, the step of selecting a cleaning mode based on a comparison result for cleaning may include: in a case that the reference data is a reference value, a cleaning mode is selected based on a difference value between the current environment parameter of the position and the reference value; and in a case that the reference data is an range value, a cleaning mode is selected based on the range value into which the current environment parameter of the current position falls.

If the reflectivity of the floor obtained by the automatic cleaning device is used as a reference data, the reference data is usually a reference value, because cleanliness of the cleaned floor is usually uniform, for example, the reflectivity of the cleaned floor may be 90%. However, if the pre-clean reflectivity of the floor is used as the reference data, the reference data is usually a range, such as reflectivity of 50%-60%, because the degrees of dirtiness of a floor may change. In a case that the reference data is a reference value, such as 90%, the obtained reflectivity of the current position is 30%, which indicates that the floor is at a high degree of dirtiness and a strong cleaning mode may be selected. In a case that the reflectivity is 60%, it indicates that the floor is at a low degree of dirtiness and a light cleaning mode may be selected. In a case that the reference data is a range, for example, the reference ranges for the living room are 30%-50%, 50%-60%, and 60%-90%, which correspond to the strong, medium, and light cleaning mode, respectively, therefore, a cleaning mode is determined based on the obtained reflectively.

Optionally, the method further includes step S610, which includes calibrating the first sensor and/or the second sensor.

Optionally, the step of calibrating the first sensor and/or the second sensor may include: obtaining a historical environment parameter of a position; forming reference data based on the historical environment parameter of the position; obtaining a current environment parameter of the position by the automatic cleaning device, and comparing the current environment parameter of the position with the reference data of the position; and determining, based on a comparison result, whether the first sensor and/or the second sensor need/needs to be calibrated.

In a case that the detection sensor is blocked by dust, etc., the accuracy of detection may be affected. To avoid such case, a calibration instruction may be arranged on a base station and other devices. For example, the cleaning device may detect reflectivity of the region of the base station when the cleaning device returns to the base station for charging. When the difference between the reflectivity and the historical data is large, it may indicate that the detection sensor of the cleaning device has a detection error and a calibration for the detection sensor may be performed.

The cleaning device in the embodiments of the present disclosure effectively detects the floor environment during working, and accumulates the environment parameters of a region to form a comparison reference. When the cleaning device cleans the region again, the cleaning device adjusts the cleaning mode or the moving direction based on a comparison result between the detected floor environment parameter of the region and the reference parameter. This improves the intelligence of the cleaning device. In addition, selecting different working modes based on different cleaning conditions reduces energy consumption and improves the overall user experience of the cleaning device.

Figure 7:
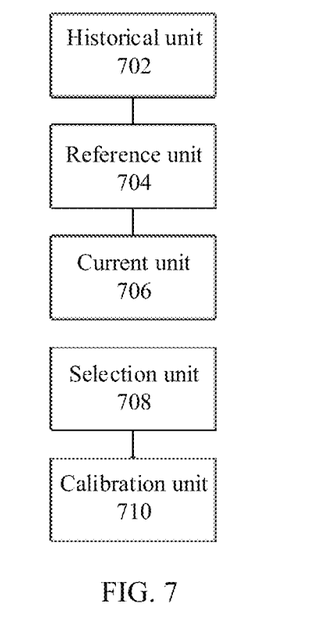
FIG. 7 is a structural block diagram of an apparatus for controlling an automatic cleaning device according to some embodiments of the present disclosure.

FIG. 7 shows an automatic cleaning device applied to the application scenario in FIG. 1. Embodiments of the present disclosure provide an apparatus for controlling an automatic cleaning device. The apparatuses provided in the embodiments are used to implement the steps of the method described in the method embodiments. These embodiments provide the same explanation for the meaning of the same name as the method embodiments, and have the same technical effects as the method embodiments. Details are omitted herein for simplicity. The apparatus specifically includes a first obtaining unit 702, a reference unit 704, a second obtaining unit 706, and a control unit 708.

The first obtaining unit 702 is configured to obtain a historical environment parameter of a working region.

Optionally, the first acquisition unit 702 may be further configured to: obtain a pre-clean historical environment parameter of the working region or a post-clean historical environment parameter of the working region; and form a pre-clean historical environment parameter dataset or a post-clean historical environment parameter dataset based on the obtained pre-clean historical environment parameters or the post-clean historical environment parameters, respectively.

Optionally, in some implementations, a first sensor obtains the post-clean historical environment parameter of the working region, where the first sensor may be disposed at the back end of the automatic cleaning device; or a second sensor obtains the current environment parameter of the working region, where the second sensor is located at a front end of the automatic cleaning device.

Optionally, in other implementations, a second sensor obtains the pre-clean historical environment parameter of the working region, where the second sensor may be disposed at a front end of the automatic cleaning device; or the second sensor obtains the current environment parameter of the working region.

Optionally, in some implementations, the first obtaining unit 702 may be configured to: determine a position of the working region by using a navigation system of the automatic cleaning device; and obtaining the historical environment parameter based on the position.

The reference unit 704 is configured to form reference data based on the historical environment parameter, where the reference data may be a reference value or at least one range value, and the reference data may be stored in the automatic cleaning device or in a server.

Optionally, the reference unit 704 may be further configured to: screen a pre-clean historical environment parameter dataset or a post-clean historical environment parameter dataset; and perform an averaging operation on the screened dataset, and form the reference data based on the averaged dataset.

The second obtaining unit 706 is configured to obtain a current environment parameter of the working region, and compare the current environment parameter with the reference data.

Optionally, the second acquisition unit 706 may be further configured to: determine a position of the working region by using a navigation system of the automatic cleaning device; obtain a current environment parameter of the positon in real time; and compare the current environment parameter with the reference data.

The control unit 708 is configured to select a cleaning mode based on a comparison result for cleaning.

Optionally, the control unit 708 is further configured to: in a case that the reference data is a reference value, select a cleaning mode based on a difference between the current environment parameter and the reference value; and in a case that the reference data is a range value, select a cleaning mode based on the range value into which the current environment parameter falls.

Optionally, the apparatus may further include a calibration unit 710, configured to calibrate the first sensor 20 and/or the second sensor 21.

Optionally, the calibration unit 710 may be configured to: obtain a historical environment parameter of a position; form reference data based on the historical environment parameter of the position; obtain a current environment parameter of the position, and compare the current environment parameter with the reference data; and determine, based on a comparison result, whether the first sensor 20 and/or the second sensor 21 need/needs to be calibrated.

The cleaning device in the embodiments of the present disclosure effectively detects the floor environment during working, and accumulates the environment parameters of a working region to form a comparison reference. When the cleaning device clean the region again, the cleaning device adjusts the cleaning mode or the moving direction based on a comparison result between the current floor environment parameter and the reference parameter. This improves the intelligence of the cleaning device. In addition, selecting different working modes based on different cleaning conditions reduces energy consumption and improves the overall user experience of the cleaning robot.

Figure 8:
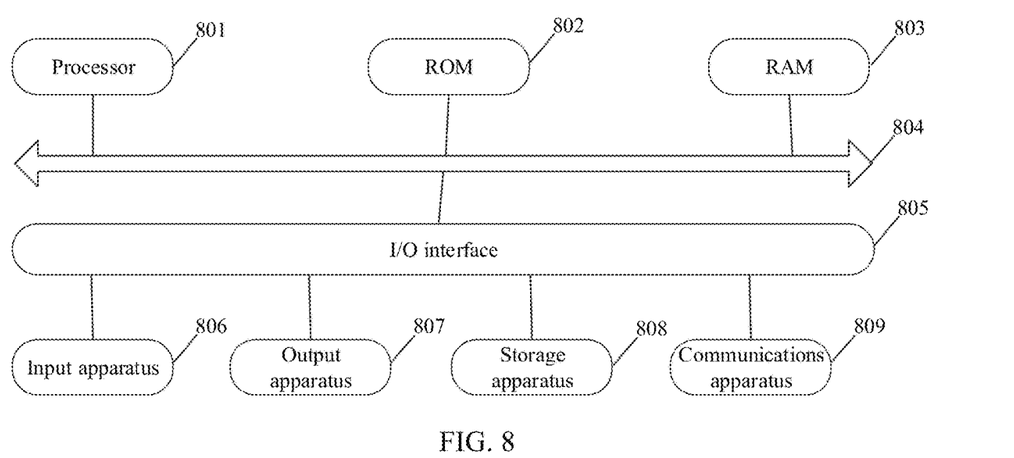
FIG. 8 is a schematic diagram of an electronic structure of an automatic cleaning device according to some embodiments of the present disclosure.

As shown in FIG. 8, embodiments of the present disclosure provide an electronic device, where the electronic device includes: at least one processor; and a memory communicatively connected to the at least one processor, where the memory stores instructions that can be executed by the at least one processor, and the instructions are executed by the at least one processor to enable the at least one processor to perform the steps of the method described in the foregoing embodiments.

Embodiments of the present disclosure provide a non-transitory computer storage medium, where the computer storage medium stores computer-executable instructions, and the computer-executable instructions can perform the steps of the method described in the foregoing embodiments.

As shown in FIG. 8, the automatic cleaning device may include a processor (such as a central processing unit or a graphics processor) 801. The processor 801 may perform various appropriate actions and processing based on a program that is stored in a read-only memory (ROM) 802 or a program that is loaded from a memory 808 to a random access memory (RAM) 803. The RAM 803 further stores various programs and data necessary for operating the electronic device. The processing apparatus 801, the ROM 802, and the RAM 803 are connected to each other by using a bus 804. An input/output (I/O) interface 805 is also connected to the bus 804.

Generally, apparatuses that may be connected to the I/O interface 805 include: input apparatuses 806 such as a touchscreen, a touch pad, a keyboard, a mouse, a camera, a microphone, an accelerometer, and a gyroscope; output apparatuses 807 such as a liquid crystal display (LCD), a speaker, and a vibrator; storage apparatuses 808 such as a magnetic tape and a hard disk; and communications apparatuses 809. The communications apparatus 809 may allow the electronic device to perform wireless or wired communication with other devices to exchange data. Although FIG. 8 shows the electronic device having various apparatuses, it should be understood that not all shown apparatuses need to be implemented or included. More or fewer apparatuses can be implemented or included alternatively.

In particular, according to some embodiments of the present disclosure, the process described above with reference to the flowchart can be implemented as a computer software program. For example, the embodiments of the present disclosure include a computer program product. The computer program product includes a computer program that is carried on a computer-readable medium. The computer program includes program code for performing the method shown in the flowchart. In these embodiments, the computer program can be downloaded and installed from a network by using the communications apparatus 809, installed from the storage apparatus 808, or installed from the ROM 802. When the computer program is executed by the processing apparatus 801, the foregoing functions defined in the method in the embodiments of the present disclosure are executed.

It should be noted that, the foregoing computer-readable medium in the present disclosure may be a computer-readable signal medium or a computer-readable storage medium, or any combination thereof. For example, the computer-readable storage medium may be, but is not limited to, an electrical, magnetic, optical, electromagnetic, infrared, or semiconductor system, apparatus or device, or any combination thereof. More specific examples of the computer-readable storage media may include but are not limited to an electrical connection with one or more conducting wires, a portable computer disk, a hard disk, a RAM, a ROM, an erasable programmable read-only memory (EPROM or flash memory), an optical fiber, a portable compact disk read-only memory (CD-ROM), an optical storage device, and a magnetic storage device, or any suitable combination thereof. In the present disclosure, the computer-readable storage medium may be any tangible medium containing or storing a program. The program may be used by or in combination with an instruction execution system, apparatus, or device. In the present disclosure, the computer-readable signal medium may include a data signal that is propagated in a baseband or as a part of a carrier, and carries computer-readable program code. Such propagated data signal may take a plurality of forms, including, but not limited to, an electromagnetic signal and an optical signal, or any suitable combination thereof. The computer-readable signal medium may also be any computer-readable medium other than the computer-readable storage medium. The computer-readable signal medium can send, propagate, or transmit a program for use by or in combination with an instruction execution system, apparatus, or device. The program code included in the computer-readable medium can be transmitted in any suitable medium, including, but not limited to, a cable, an optical cable, radio frequency, and the like, or any suitable combination thereof.

The foregoing computer-readable medium may be included in the foregoing electronic device, or may exist alone without being assembled into the electronic device.

Computer program code for performing an operation of the present disclosure can be written in one or more program design languages or a combination thereof. The program design languages include object-oriented program design languages such as Java, Smalltalk, and C++, and conventional procedural program design languages such as C or a similar program design language. The program code can be executed entirely on a user computer, partly on a user computer, as a separate software package, partly on a user computer and partly on a remote computer, or entirely on a remote computer or server. In a case involving a remote computer, the remote computer can be connected to a user computer through any type of network, including a local area network or a wide area network. Alternatively, the remote computer can be connected to an external computer (for example, by using an Internet service provider for connection over the Internet).

The flowcharts and block diagrams in the accompanying drawings show the architectures, functions, and operations that may be implemented based on the systems, methods, and computer program products in various embodiments of the present disclosure. In this regard, each block in the flowchart or block diagram may represent one module, one program segment, or one part of code. The module, the program segment, or the part of code includes one or more executable instructions for implementing specified logical functions. It should also be noted that, in some alternative implementations, the functions marked in the blocks can occur in an order different from that marked in the figures. For example, two consecutive blocks can actually be executed in parallel, and sometimes they can also be executed in reverse order, depending on the function involved. It should also be noted that, each block in the block diagram and/or flowchart, and a combination of blocks in the block diagram and/or flowchart can be implemented by using a dedicated hardware-based system that performs a specified function or operation, or can be implemented by using a combination of dedicated hardware and computer instructions.

The units described in the embodiments of the present disclosure can be implemented by software or hardware. In some cases, a name of a unit does not constitute a restriction on the unit.

The previously described apparatus embodiments are merely examples. The units described as separate parts may or may not be physically separate, and parts displayed as units may or may not be physical units, may be located at one position, or may be distributed on a plurality of network units. Some or all of the modules may be selected according to actual needs to achieve the objectives of the solutions of the embodiments. Persons of ordinary skill in the art can understand and implement the embodiments of the present disclosure without creative efforts.

Finally, it should be noted that the foregoing embodiments are merely intended for describing the technical solutions in the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions in the embodiments of the present disclosure.

What is claimed is:

1. A method for controlling an automatic cleaning device, comprising:
    obtaining a position of a working region of the automatic cleaning device;
    obtaining a historical environment parameter of the working region to form a historical environment parameter dataset;
    forming a reference data associated with the working region based on the historical environment parameter dataset, wherein the reference data comprises value ranges;
    obtaining a current environment parameter of the working region;
    comparing the current environment parameter with the reference data to generate a comparing result; and
    controlling the automatic cleaning device based on the comparison result,
    wherein the controlling the automatic cleaning device based on the comparison result, comprises:
    obtaining, from the value ranges, a value range in which the current environment parameter is located;
    selecting a cleaning mode based on the value range, wherein the method further comprises:

obtaining a historical environment parameter of a specified position and a current environment parameter of the specified position; and determining, according to the current environment parameter of the specified position and the reference data formed based on the historical environment parameter of the specified position, whether to calibrate at least one of a first sensor or a second sensor, wherein the first sensor is disposed at a back end of the automatic cleaning device, and the second sensor is disposed at a front end of the automatic cleaning device.

2. The method according to claim 1, wherein the forming the reference data associated with the working region based on the historical environment parameter dataset, comprises:
screening the historical environment parameter dataset; and
performing an averaging operation on the screened dataset to form the reference data.

3. The method according to claim 1, wherein
the obtaining a historical environment parameter of the working region, comprises:
obtaining, by the first sensor disposed at the back end of the automatic cleaning device, a post-clean historical environment parameter of the working region, and
the forming the reference data associated with the working region based on the historical environment parameter dataset, comprises:
forming a post-clean reference data associated with the working region based on the post-clean historical environment parameter.

4. The method according to claim 3, wherein the obtaining a current environment parameter of the working region, comprises:
obtaining, by the second sensor disposed at the front end of the automatic cleaning device, the current environment parameter of the working region.

5. The method according to claim 4, wherein the comparing the current environment parameter with the reference data, comprises:
comparing the current environment parameter with the post-clean reference data associated with the working region.

6. The method according to claim 4, further comprising:
calibrating the first sensor disposed at the front end of the automatic cleaning device.

7. The method according to claim 1, wherein the reference data associated with the working region is stored in the automatic cleaning device or a server.

8. The method according to claim 1, wherein the current environment parameter of the working region comprises a reflectivity of the working region.

9. An automatic cleaning device, comprising:
a processor, and
a memory, configured to store computer program instructions, wherein
the processor is configured to execute the computer program instructions to perform operations of:
obtaining a position of a working region of the automatic cleaning device;
obtaining a historical environment parameter of the working region to form a historical environment parameter dataset;
forming a reference data associated with the working region based on the historical environment parameter dataset, wherein the reference data comprises value ranges;
obtaining a current environment parameter of the working region;
comparing the current environment parameter with the reference data to generate a comparing result; and
controlling the automatic cleaning device based on the comparison result,
wherein the controlling the automatic cleaning device based on the comparison result, comprises:
obtaining, from the value ranges, a value range in which the current environment parameter is located;
selecting a cleaning mode based on the value range,
wherein the processor is further configured to execute the computer program instructions to perform operations of:
obtaining a historical environment parameter of a specified position and a current environment parameter of the specified position; and
determining, according to the current environment parameter of the specified position and the reference data formed based on the historical environment parameter of the specified position, whether to calibrate at least one of a first sensor or a second sensor, wherein
the first sensor is disposed at a back end of the automatic cleaning device, and
the second sensor is disposed at a front end of the automatic cleaning device.

10. The automatic cleaning device according to claim 9, wherein the reference data associated with the working region is stored in the automatic cleaning device or a server.

11. The automatic cleaning device according to claim 9, wherein the current environment parameter of the working region comprises a reflectivity of the working region.

12. A non-transitory storage medium, configured to store computer program instructions, wherein the computer program instructions are configured to be executed by a processor to perform operations of:
obtaining a position of a working region of the automatic cleaning device;
obtaining a historical environment parameter of the working region to form a historical environment parameter dataset;
forming a reference data associated with the working region based on the historical environment parameter dataset, wherein the reference data comprises value ranges;
obtaining a current environment parameter of the working region;
comparing the current environment parameter with the reference data to generate a comparing result; and
controlling the automatic cleaning device based on the comparison result,
wherein the controlling the automatic cleaning device based on the comparison result, comprises:
obtaining, from the value ranges, a value range in which the current environment parameter is located;
selecting a cleaning mode based on the value range,
wherein the computer program instructions are further configured to be executed by a processor to perform operations of:
obtaining a historical environment parameter of a specified position and a current environment parameter of the specified position; and
determining, according to the current environment parameter of the specified position and the reference data formed based on the historical environment parameter of the specified position, whether to calibrate at least one of a first sensor or a second sensor, wherein the first sensor is disposed at a back end of the automatic cleaning device, and the second sensor is disposed at a front end of the automatic cleaning device.

* * * * *